June 26, 1956     J. P. DACEY     2,751,643
WEATHER STRIPPING

Filed Oct. 24, 1951     2 Sheets-Sheet 1

INVENTOR.
John P. Dacey
BY
Hyde, Meyer, Baldwin & Doran
ATTORNEYS

June 26, 1956  J. P. DACEY  2,751,643
WEATHER STRIPPING
Filed Oct. 24, 1951 2 Sheets-Sheet 2
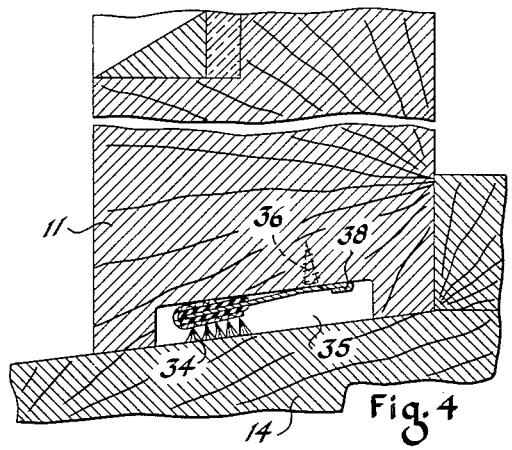
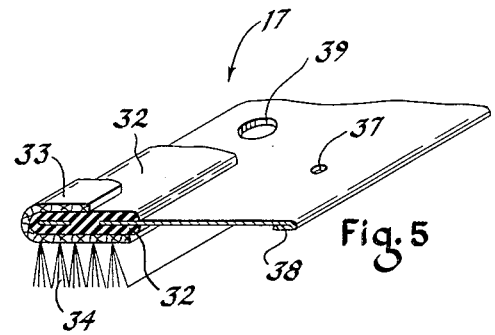
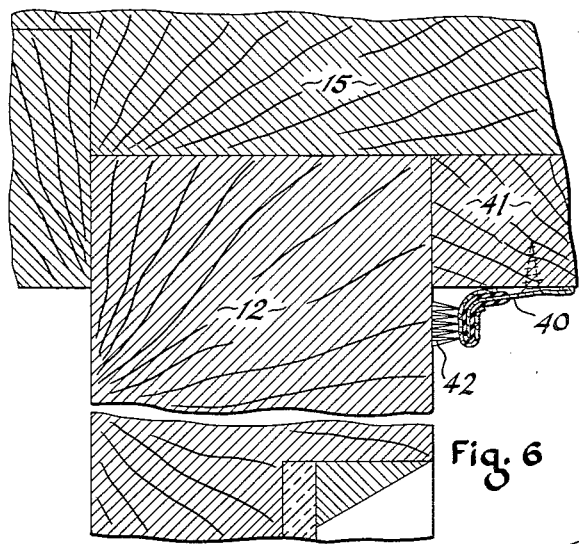
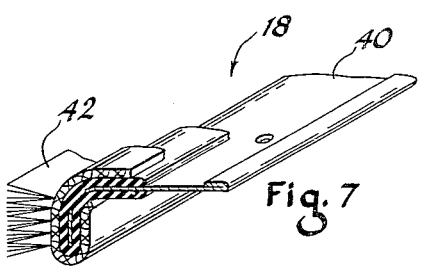
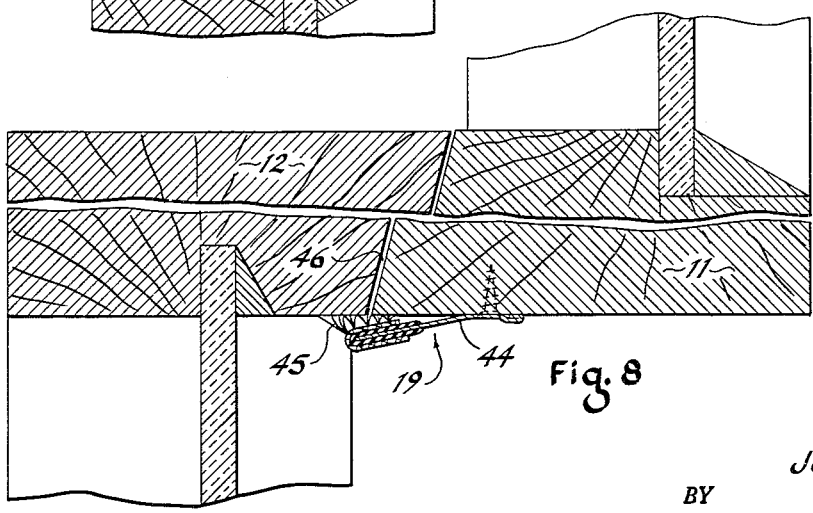
INVENTOR.
John P. Dacey
BY
Hyde, Meyer, Baldwin & Doran
ATTORNEYS

United States Patent Office 2,751,643
Patented June 26, 1956

2,751,643

WEATHER STRIPPING

John P. Dacey, Winchester, Mass., assignor to The Standard Products Company, Cleveland, Ohio, a corporation of Ohio Application October 24, 1951, Serial No. 252,821

3 Claims. (Cl. 20—69)

This invention relates to weather stripping and although not limited in its use thereto, the present weather stripping is particularly suitable for use with double hung windows having wooden sash frames.

The invention has for one of its objects the provision of weather stripping which comprises a series of elongated weather strip members for securement to various portions of the upper and lower window sash frames or to the surrounding casing structure in a manner to completely and effectively seal the joints between the window sash frames and the casing structure and the joint between the upper and lower window sashes when said sashes are in closed positions.

A further object of the preesnt invention is the provision of a series of weather strip members which comprise resilient metal strips having portions thereof coated with rubber or rubber-like material and covered by pile fabric for the formation of highly efficient joint-sealing areas or sections, the resiliency of the metal strips, the elasticity of the rubber or rubber-like coatings, and the flexibility of the pile fibers enabling the present weather strip members to accommodate themselves to various windows and casing structures in a manner to initially achieve, and thereafter to automatically maintain, highly effective joint-sealing results.

A further object of the present invention is the provision of weather stripping which includes a pair of side members having metal strips which are bent to form longitudinally disposed channel-shaped portions for location in the space between the planes of movement of the upper and lower window sashes and which serve as inner guiding stops for such window sashes, thus making unnecessary the wooden parting strips of present day casing structures, and which longitudinally disposed channel-shaped portions are coated with rubber or rubber-like material and covered by pile fabric for their primary function of sealing the joints between the side portions or stiles of the window sash frames and the side portions or stiles of the casing structure.

A further object of the present invention is the provision of weather strip members which are characterized by their structural simplicity, the economy of their manufacture, their sturdy and durable nature, and their joint-sealing efficiency.

Further objects of the present invention, and certain of its practical advantages, will be referred to in or will be evident from the following description of weather stripping embodying the present invention, as illustrated in the accompanying drawings, in which Fig. 1 is a front elevational view of a window and a casing structure provided with the present improved weather stripping;

Fig. 4 is an enlarged detail vertical sectional view, on the line 4—4 of Fig. 1, and showing the bottom member of the present weather stripping;

Fig. 5 is a fragmentary perspective view of such weather strip bottom member, on the enlarged scale of Fig. 4;

Fig. 6 is an enlarged detail vertical sectional view, on the line 6—6 of Fig. 1, and showing the top member of the present weather stripping;

Fig. 7 is a fragmentary perspective view of such weather strip top member, on the enlarged scale of Fig. 6; and Fig. 8 is an enlarged detail vertical sectional view, on the line 8—8 of Fig. 1, and showing the weather strip member which seals the joint between the upper and lower window sashes when said sashes are in closed positions.

Before the weather stripping here illustrated is specifically described, it is to be understood that the present invention is not limited to the structural details or the particular arrangement of the parts of such illustrated weather stripping, as weather stripping embodying the invention may take various forms. It also is to be understood that the terminology or phraseology herein used is for purposes of description and not of limitation, the scope of the present invention being denoted by the appendant claims.

Figure 1:
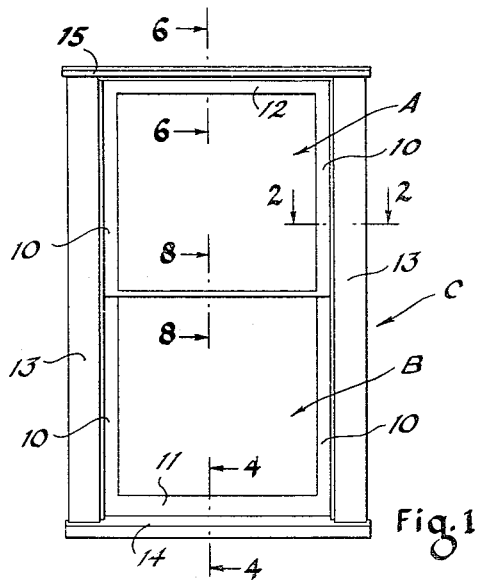

For the disclosure of weather stripping embodying the present invention, there is illustrated in Fig. 1, and fragmentarily in Figs. 2, 4, 6 and 8, a double hung window, consisting of an upper sash A and a lower sash B, and a surrounding casing structure C in which said window sashes have the usual sliding movement. As here shown, the frames of the window sashes A and B and the surrounding casing structure C are of wood, with each sash frame comprising a pair of side portions or stiles 10, a bottom portion or bottom rail 11, and a top portion or top rail 12, and with the casing structure C comprising a pair of side portions or stiles 13, a bottom portion or sill 14, and a top portion or lintel 15, all as is usual in window sashes and casing structures of the type here involved.

The present improved weather stripping, for sealing the joints between the window sashes and the surrounding casing structure and also the joint between the two window sashes when said sashes are in their closed positions, comprises a set of weather strip members, each of which consists of a strip of resilient sheet metal, such as spring steel, having a portion thereof coated with rubber or rubber-like material and covered by pile fabric to provide a joint-sealing area or section which is of exceptionally high efficiency and of unusually great durability.

In the present embodiment of the invention, there are five weather strip members in the set, namely, a pair of duplicate side members 16 for sealing the joints between the stiles 10 of the window sashes A and B and the stiles 13 of the casing structure C, a bottom member 17 for sealing the joint between the bottom rail 11 of the lower sash B and the sill 14 of the casing structure, a top member 18 for sealing the joint between the top rail 12 of the upper sash A and the lintel 15 of the casing structure, and an intermediate member 19 for sealing the joint between the bottom rail 11 of the upper sash A and the top rail 12 of the lower sash B when said sashes are in their closed positions.

Figure 2:
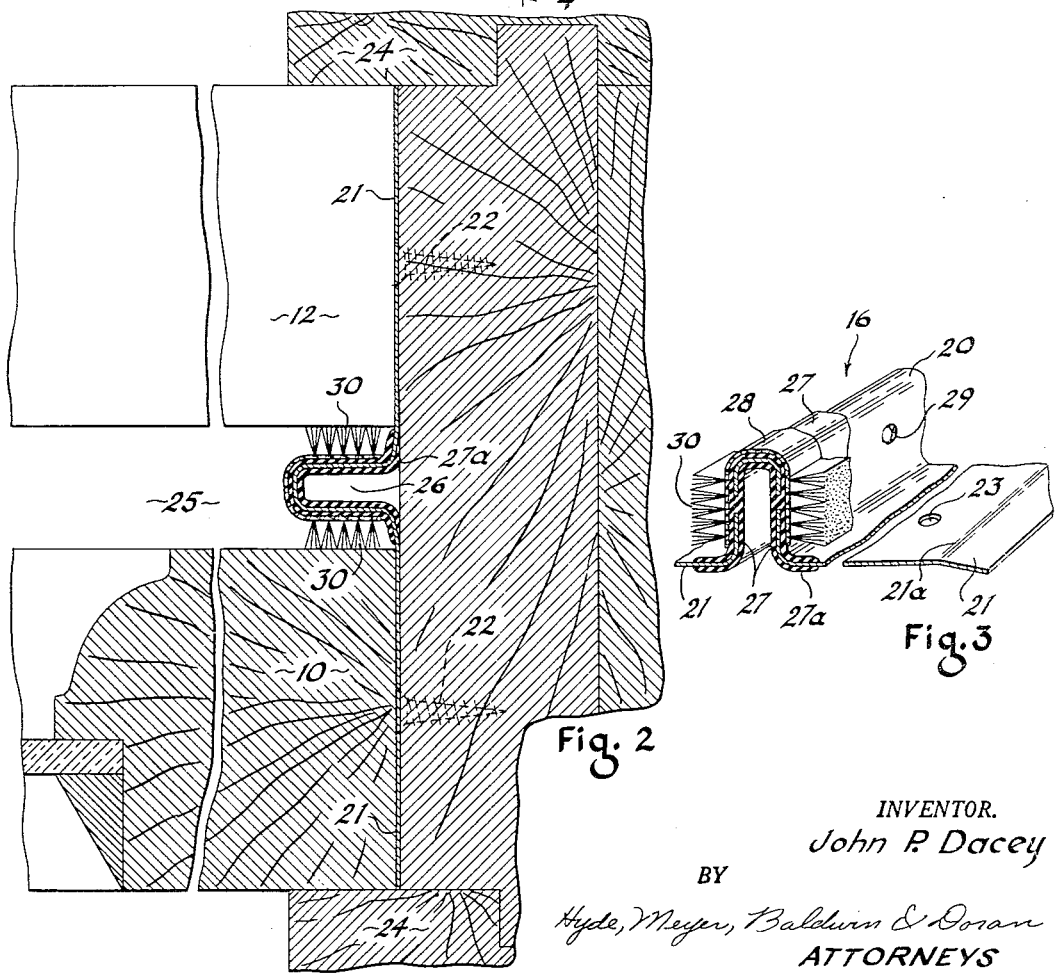
Fig. 2 is an enlarged detail horizontal sectional view, on the line 2—2 of Fig. 1, and showing one of the side members of said weather stripping.
Figure 3:
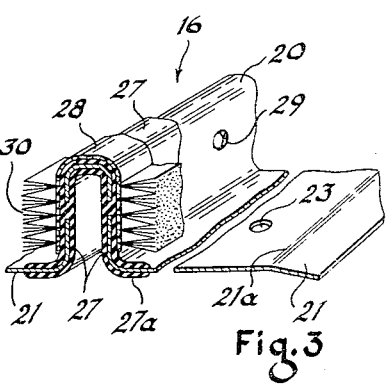
Fig. 3 is a fragmentary perspective view of such weather strip side member, on the enlarged scale of Fig. 2.

In Figs. 2 and 3 is illustrated one of the two duplicate side members 16 of the present weather stripping namely, the one for the right side of the window, as viewed in Fig. 1. However, as the two weather strip side members 16 are duplicates, the illustrations of Figs. 2 and 3, and the following description of the right hand side member shown therein, are equally applicable to the other or left hand side member, as will be readily understood.

As shown in Figs. 2 and 3, the right hand side member 16 comprises a resilient metal strip which is bent to provide a channel-shaped ridge or rib 20 along its longitudinal axis, with the side edge portions of the strip on opposite sides of said ridge or rib providing a pair of flanges 21 by which the strip may be secured, such as by screws 22, to the right hand stile 13 of the casing structure C, the flanges 21 being provided with suitable apertures 23 to receive such screws.

The length of the strip is, of course, equal or substantially equal to the height of the window opening, and the width of the strip is such that its securing flanges 21 lie alongside at least substantial portions of the outer edge faces of the sash frame stiles and thus serve as bearing surfaces for said stile faces in the sliding movement of the window sashes. If desired and as here shown, the width of the side member strip may be such as to completely bridge the space between the outer guiding stops 24 for the window sashes, the stops being, of course, parts of the casing structure C.

As shown in Fig. 2, the longitudinally extending ridge or rib 20 of the strip is located in the space 25 between the planes of movement of the window sashes A and B, with the depth and the width of said ridge or rib being such as to enable it to serve as a substitute for the parting strip or inner guiding stop with which present day casing structures of the type here involved are provided. As a result, use of the present day parting strips or inner guiding stops as unitary parts of the casing structures may be dispensed with.

For its use as a parting strip or inner guiding stop for the upper and lower sashes, and for its primary joint-sealing use, the ridge or rib 20 of the present resilient metal strip is coated with layers of rubber or rubber-like material 27, and the outer layer provided with a pile fabric covering 28. For manufacturing simplicity and economy, the layers of rubber or rubber-like material are applied by an extruding machine and preferably while the resilient metal strip is in flat form, and the pile fabric covering preferably is applied to the outer layer (the one outside the channel 26) of the rubber or rubber-like material while such material is still in a relatively soft and tacky condition. To aid in the adherence thereto of the layers of rubber or rubber-like material, the ridge or rib 20 may be provided with longitudinally spaced apertures, such as the apertures 29 in the side walls of the ridge or rib, through which the rubber or rubber-like material may flow in its application to the resilient metal strip to thereby "key" one layer to the other, as will be readily understood.

Although the pile fabric covering 28 may be provided with pile fibers 30 over its entire area, it is here provided with such fibers only on those portions thereof which overlie the side walls of the ridge or rib 20. Thus, there is an elongated mass of pile fibers on one side of said ridge or rib for sealing engagement with the upper sash A and a corresponding elongated mass of pile fibers on the other side of said ridge or rib for sealing engagement with the lower sash B, with the consequent complete sealing of the joint between the right hand stiles 10 of the window sashes and the right hand stile 13 of the casing structure. Moreover, the ridge or rib 20, with its masses of sealing pile fibers 30 on both sides thereof, serves as an inner guiding stop for the window sashes A and B, the outer guiding stops therefor being denoted by the reference numeral 24, as heretofore mentioned.

To insure that the weather strip side member 16 will tightly engage, throughout its length, the casing structure stile 13, the longitudinal edge portions of the securing flanges 21 of said member may be slightly bent toward such stile, as at 21a, Figs. 2 and 3. Moreover, the layers of rubber or rubber-like material 27 (or at least that layer which is disposed within the channel 26 of the ridge or rib 20) may be of such width as to extend onto the inner longitudinal edge portions of the flanges 21, as at 27a, Figs. 2 and 3, with the consequent sealing engagement of said elastic material with the casing structure stile 13, as in Fig. 2.

In a similar manner, the other side member 16 of the present weather stripping, for the left hand side of the window, effectively seals the joint at this side, and also serves as an inner guiding stop for the window sashes, as will be readily understood.

In Figs. 4 and 5 is illustrated the bottom member 17 of the present weather stripping, for sealing the joint between the bottom rail 11 of the lower sash B and the sill 14 of the casing structure C. As best shown in Fig. 5, this bottom member comprises a strip of resilient sheet metal, such as spring steel, having one of its longitudinal edge portions provided on both sides thereof with layers of rubber or rubber-like material 32, and with at least one of said layers being provided with a pile fabric covering 33. As here illustrated, the fabric covering completely overlies one layer and partially overlies the other, but only that portion of such covering which completely overlies such one layer is here provided with pile fibers 34 for joint-sealing purposes.

Although the bottom weather strip member may be secured to the casing structure sill 14 for sealing engagement with the bottom rail 11 of the lower window sash B, said bottom member is here shown as mounted in an elongated recess 35 in the bottom wall of said sash rail 11, the mounting being effected by the use of screws 36 for which apertures 37 are provided in the metal strip of said members. For increased strength and rigidity, the uncoated longitudinal edge portion of said metal strip may be bent reversely or back upon itself, as at 38, and apertures 39 may be provided in the strip for the "keying" of one layer of the rubber or rubber-like material 32 to the other layer thereof.

As shown in Fig. 4, the depending pile fibers 34 of the bottom weather strip member project below the sash rail 11 for sealing engagement with the casing structure sill 14, and as such weather strip member, and its sealing fibers 34, extend completely across the window opening, the groove between the bottom rail of the lower window sash B and the sill 14 of the casing structure C is completely and effectively sealed when said window sash is in its closed or lowermost position, as will be readily understood.

In Figs. 6 and 7 is illustrated the top member 18 of the present weather stripping, and as will be noted, such member differs from the bottom weather strip member 17 only in that the top member 18 is bent to give it a generally right-angular form in cross section. This enables the uncoated longitudinal edge portion 40 of the resilient metal strip of the top member to be screwed or otherwise suitably secured to the lower, horizontally disposed surface of the outer guiding stop 41 for the upper window sash A, and the coated, pile-carrying longitudinal edge portion of such strip to lie alongside the plane of movement of the upper sash, with the elongated mass of pile fibers 42 of the strip in sealing engagement with the outer surface of the top rail 12 of the upper sash when said sash is in its closed or uppermost position, as in Fig. 6. As the top member 18 and its sealing fibers 42 extend completely across the window opening, the joint between the top rail of the upper sash and the lintel 15 of the casing structure is completely and effectively sealed when the upper sash is closed.

In Fig. 8 is illustrated the intermediate member 19 of the present weather stripping, the member by which is sealed the joint between the upper and lower window sashes when said sashes are in their closed positions. As here shown, this intermediate member differs from the top weather strip member 18 of Figs. 6 and 7 only in that said intermediate member is but slightly angular in cross section.

In use, the uncoated longitudinal edge portion 44 of the resilient metal strip of this intermediate member is screwed or otherwise suitably secured to the lower surface of the bottom rail 11 of the upper window sash A, with the upwardly extending pile fibers 45 of said member disposed in a position to underlie and effectively seal the joint 46 between the upper sash bottom rail 11 and the lower sash top rail 12 when the two sashes are in their closed positions, as in Fig. 8. Inasmuch as the intermediate weather strip member and its sealing pile fibers 45 extend completely across the window opening, the joint 46 between the two sashes is, of course, completely sealed by said weather strip member, as will be readily understood.

From the foregoing description of weather stripping embodying the present invention, it will be evident that the present weather strip members are of simple and inexpensive form, and of a number and character to completely and effectively seal all joints between the window sashes and their surrounding casing structure and the joint between the two sashes. The pile fibers of the weather strip members may be of cut form, as here shown, or of uncut form, but in either case, they are of sufficient density, strength, length and flexibility to provide highly efficient and unusually durable joint-sealing areas or sections.

To those skilled in the art to which the present invention relates, other features and advantages of weather stripping embodying the present invention will be evident from the foregoing description of one such embodiment.

What I claim is:

1. A weather strip member for a double hung window structure having upper and lower relatively movable sashes, said member comprising a strip of resilient sheet metal provided with a longitudinally disposed ridge or rib for location in the space between the planes of movement of said window sashes and constituting inner guiding stops for said sashes, the side walls of said ridge or rib being coated with rubber-like material and provided with fabric coverings having elongated masses of pile fibers for sealing engagement with said window sashes, the side walls of said ridge or rib being apertured to receive said rubber-like material to thereby aid in the securement of such rubber-like material to the side walls of said ridge or rib.

2. A weather strip member for a double hung window structure having upper and lower relatively movable sashes, said member comprising a strip of resilient sheet metal provided with a longitudinally disposed ridge or rib for location in the space between the planes of movement of said sashes and constituting inner guiding stops for said sashes, the side walls of said ridge or rib being substantially parallel and being provided with fabric coverings having elongated masses of pile fibers for sealing engagement with said window sashes, and said strip also having longitudinal flange portions on opposite sides of said ridge or rib and which serve as bearing runways for said window sashes.

3. A weather strip member for a double hung window structure having upper and lower relatively movable sashes, said member comprising a strip of resilient sheet metal provided with a longitudinally disposed ridge or rib for location in the space between the planes of movement of said sashes and constituting inner guiding stops for said sashes, a rubber or rubber-like coating for said ridge or rib, the rubber or rubber-like coating for the side walls of said ridge or rib being provided with fabric coverings having elongated masses of pile fibers for sealing engagement with said window sashes, and said strip also having longitudinal flange portions on opposite sides of said ridge or rib and lying in the same general plane, said flange portions being provided with apertures for the reception of attaching elements and said flange portions serving as bearing runways for said window sashes.

References Cited in the file of this patent

UNITED STATES PATENTS

| | | |
|---|---|---|
| 2,108,450 | Schlegel | Feb. 15, 1938 |
| 2,132,748 | Mohun | Oct. 11, 1938 |
| 2,169,503 | Schlegel | Aug. 15, 1939 |
| 2,264,588 | Rydquist | Dec. 2, 1941 |
| 2,267,021 | Glass | Dec. 23, 1941 |
| 2,570,523 | Clerk | Oct. 9, 1951 |
| 2,613,408 | Bailey | Oct. 14, 1952 |
| 2,649,329 | Bratton et al. | Aug. 18, 1953 |
| 2,660,764 | Lee | Dec. 1, 1953 |